United States Patent Office 2,924,628
Patented Feb. 9, 1960

2,924,628

ISOMERIZATION PROCESS

George R. Donaldson, Barrington, Ill., assignor, by mesne assignments, to Universal Oil Products Company, Chicago, Ill., a corporation of Delaware No Drawing. Application October 19, 1956
Serial No. 616,932

16 Claims. (Cl. 260—666)

This invention relates to the isomerization of an isomerizable compound and more particularly relates to a combination process in which a novel catalytic composition can be utilized to effect the desired isomerization. Still more particularly, this invention relates to a combination process in which an isomerizable compound containing minor quantities of impurities is first treated to remove said impurities followed by isomerization in the presence of a novel catalytic composition sensitive to said impurities.

In recent years with the advances in the automotive industry, fuels of relatively high octane ratings have been found necessary. Many methods have been provided for the production of high antiknock fuels. These methods include such processes as alkylation, catalytic reforming, catalytic cracking, and high temperature thermal cracking and reforming operations. Other processes which may be considered in one sense auxiliary were developed, for example, isomerization which was employed to produce isoparaffins which subsequently were reacted with olefins to form a high octane number motor fuel fraction, commonly termed alkylate. In addition to the production of one of the reactants for alkylation, isomerization was also utilized to increase the antiknock quality of saturated hydrocarbons such as paraffins and naphthenes found in selected fractions of gasolines and naphthas. An example of the latter type of operation is a process in which pentane and/or hexane fractions are isomerized to produce isopentanes and/or isomeric hexanes, respectively, which subsequently may be employed as blending stocks for automotive and aviation fuels.

In most of the above-mentioned isomerization processes, catalytic agents are employed to effect the desired molecular rearrangement. Ordinarily, these catalytic agents consist of metal halides, such as aluminum chloride, aluminum bromide, etc., which are activated by the addition of the corresponding hydrogen halide. These catalytic agents are very active and effect high conversion per pass of such compounds as n-butane. However, the activity of these catalysts is so high that the catalysts accelerate decomposition reactions as well as isomerization reactions with the result that the ultimate yield of isomerized product is reduced. This is particularly true as the molecular weight of the isomerizable compound increases through a homologous series, such as in going from n-butane through n-pentane and n-hexane to n-heptane. This cracking also considerably increases catalyst consumption by reaction of fragmental materials with the catalytic agent to form sludge-like material. In spite of what might have been predicted, these decompositions and/or cracking reactions can not be reduced by simply lowering the reaction zone severity, for example, by reducing temperature or by increasing liquid hourly space velocity. At temperatures and space velocities at which satisfactory isomerization reactions are obtained, these reactions are pronounced. Recent developments in the field of isomerization in order to improve the antiknock characteristics of saturated hydrocarbons or to produce a reactant for catalytic alkylation have been directed to the use of a novel catalytic agent which can be more effectively employed. More particularly, these catalytic agents comprise calcined composites of a Friedel-Crafts metal halide and refractory oxide. A particularly preferred catalyst of this general type is a catalyst comprising a calcined composite of a Friedel-Crafts aluminum halide and gamma-alumina. While the alumina is used as a support in the catalysts utilized in the process of the present invention, the alumina have functions other than as a support which functions will be set forth hereinafter in detail. The use of such a catalyst reults in high conversions of isomerizable compounds to desired inosmers thereof in the absence of catalyst activators, such as hydrogen halides, which have previously been considered necessary along with a metal halide of the Friedel-Crafts type. However, these novel catalysts have been found to be susceptible to deactivation due to minor amounts of impurities naturally occurring in isomerizable compound feed stocks utilized in such conversion processes. I have found a method by the use of which the life of such novel catalytic agents can be greatly extended. This and other objects of the combination process of the present invention will be set forth hereinafter in detail.

In one embodiment, my invention relates to a process for the isomerization of an isomerizable organic compound containing isomerization catalyst deactivating quantities of compounds of oxygen, nitrogen, and sulfur which comprises treating said compound with a treating agent at treating conditions, and contacting said compound at isomerization conditions with a catalyst prepared by vaporizing a Friedel-Crafts metal halide onto a refractory oxide, and heating said thus formed composite at a temperature above about 300° C. for a time sufficient to remove therefrom any unreacted Friedel-Crafts metal halide.

In a more specific embodiment, my invention relates to a process for the isomerization of an isomerizable saturated hydrocarbon containing isomerization catalyst deactivating quantities of compounds of oxygen, nitrogen, and sulfur which comprises treating said hydrocarbon with a treating agent at treating conditions, and contacting said hydrocarbon at isomerization conditions with a catalyst prepared by vaporizing a Friedel-Crafts metal halide onto alumina, and heating said thus formed composite at a temperature above about 300° C. for a time sufficient to remove therefrom any unreacted Friedel-Crafts metal halide.

In a still further embodiment, my invention relates to a process for the isomerization of an isomerizable saturated hydrocarbon containing isomerization catalyst deactivating quantities of compounds of oxygen, nitrogen, and sulfur which comprises treating said hydrocarbon with a drying agent at treating conditions, and contacting said hydrocarbon at isomerization conditions with a catalyst prepared by vaporizing a Friedel-Crafts aluminum halide onto alumina, and heating said thus formed composite at a temperature above about 300° C. for a time sufficient to remove therefrom any unreacted Friedel-Crafts aluminum halide.

In another embodiment, my invention relates to a process for the isomerization of an isomerizable acyclic paraffin hydrocarbon containing isomerization catalyst deactivating quantities of compounds of oxygen, nitrogen, and sulfur which comprises treating said hydrocarbon at treating conditions with hydrogen, then treating with a drying agent, and contacting said hydrocarbon at isomerization conditions with a catalyst prepared by subliming aluminum chloride onto alumina, and heating said thus formed composite at a temperature of from about 400° C. to about 600° C. for a time of from about 1 to about 48 hours to remove therefrom any unreacted aluminum chloride.

In a specific embodiment, my invention relates to a process for the isomerization of n-butane containing isomerization catalyst deactivating quantities of compounds of oxygen, nitrogen, and sulfur which comprises treating said n-butane at treating conditions with hydrogen in the presence of a hydrogenation catalyst, then treating with a drying agent, and contacting said n-butane at isomerization conditions with a catalyst prepared by subliming aluminum chloride onto gamma-alumina, and heating said thus formed composite at a temperature of from about 400° C. to about 600° C. for a time of from about 1 to about 48 hours to remove therefrom any unreacted aluminum chloride.

In another specific embodiment, my invention relates to a process for the isomerization of n-pentane containing isomerization catalyst deactivating quantities of compounds of oxygen, nitrogen, and sulfur which comprises treating said n-pentane at treating conditions with hydrogen in the presence of a hydrogenation catalyst, then treating with a drying agent, and contacting said n-pentane at isomerization conditions with a catalyst prepared by subliming aluminum chloride onto gamma-alumina, and heating said thus formed composite at a temperature of from about 400° C. to about 600° C. for a time of from about 1 to about 48 hours to remove therefrom any unreacted aluminum chloride.

In an additional specific embodiment, my invention relates to a process for the isomerization of n-hexane containing isomerization catalyst deactivating quantities of oxygen, nitrogen, and sulfur which comprises treating said n-hexane at treating conditions with hydrogen in the presence of a hydrogenation catalyst, then treating with a drying agent, and contacting said n-hexane at isomerization conditions with a catalyst prepared by subliming aluminum chloride onto gamma-alumina, and heating said thus formed composite at a temperature of from about 400° C. to about 600° C. for a time of from about 1 to about 48 hours to remove therefrom any unreacted aluminum chloride.

The process of my invention is especially applicable to the isomerization of isomerizable saturated hydrocarbons including acyclic paraffins and cyclic naphthenes, and is particularly suitable for the isomerization of straight chain and mildly branched chain paraffins containing 4 or more carbon atoms per molecule, including n-butane, n-pentane, n-hexane, n-heptane, n-octane, etc.; or cycloparaffins ordinarily containing at least 5 carbon atoms in the ring such as alkyl cyclopentanes, and cyclohexanes, including methylcyclopentane, dimethylcyclopentane, cyclohexane, methylcyclohexane, dimethylcyclohexanes, etc. It is also applicable to the conversion of mixtures of paraffins and/or naphthenes such as those derived by selective fractionation and distillation of straight run or natural gasolines and naphthas. Such mixtures of paraffins and/or naphthenes include so-called pentane fractions, n-hexane fractions, and mixtures thereof. The process of my invention is also suitable for the isomerization of olefins, for example, the isomerization of 1-butene to 2-butene, etc., the isomerization of 3-methyl-1-butene to 2-methyl-2-butene, etc. The process may also be used for the isomerization of alkylaromatic hydrocarbons, for example, the isomerization of ethylbenzene to dimethylbenzene or xylene, the isomerization of propylbenzene to methylethylbenzene or trimethylbenzene, etc. Suitable modifications in operating conditions may be necessary when the process is utilized for other than the isomerization of saturated hydrocarbons and therefore these various processes are not necessarily equivalent.

As set forth hereinabove, the process of my invention is especially applicable to the isomerization of saturated hydrocarbons such as n-butane, n-pentane, n-hexane, etc. Furthermore, these saturated hydrocarbons are usually derived as selective fractions from various naturally occurring petroleum streams. For example, they may be separated as individual components or as certain boiling range fractions by selective fractionation and distillation of straight run or natural gasolines and naphthas. It is well known that such petroleum streams contain varying minor quantities of impurities including metals, and compounds of oxygen, nitrogen, and sulfur. While the presence of some of these compounds has been previously noted, no particular attempt has been made to remove such compounds from these hydrocarbon fractions prior to the use thereof in isomerization processes. For example, aluminum chloride supported on bauxite along with hydrogen chloride has been shown to be an effective isomerization catalyst. However, the consumption of aluminum chloride in processes utilizing such a catalyst has been extremely high, for example, in the neighborhood of one pound of aluminum chloride per hundred gallons of product. This has mainly been due to the formation of large quantities of sludge-like materials which are formed due to the uncontrollable high activity of such a catalyst. Since the formation of these large quantities of sludge-like materials are inherent in the use of such a catalyst, minor quantities of impurities in the feed stocks to such processes have been ignored. As an example, it is well known that water reacts with anhydrous aluminum chloride. However, the quantities of water or other compounds of oxygen, which normally occur in these feed stocks is very low. This reaction of water with anhydrous aluminum chloride destroys the aluminum chloride as a catalyst. However, the amounts of sludge-like material formed in such processes are so high that this reaction has been so inconsequential that it has gone unnoticed. With the development of newer types of isomerization catalysts, the formation of sludge-like materials has been greatly reduced and in some instances, for all practical purposes, eliminated. However, it is necessary for these new catalysts to have relatively long useful lives so that their increased costs, and other costs due to their use, may be justified economically.

Various compounds of oxygen, nitrogen, and sulfur act as isomerization catalysts deactivating materials and thus are preferably removed prior to contacting such isomerizable saturated hydrocarbons with these recently developed catalytic agents. Compounds of oxygen which are detrimental to long catalyst life and activity include water, alcohols such as methyl alcohol, ethyl alcohol, propyl alcohols, butyl alcohols, amyl alcohols, etc., ethers such as dimethyl ether, methylethyl ether, diethyl ether, etc., aldehydes such as formaldehyde, acetaldehyde, propionaldehyde, butyraldehydes, etc., ketones such as acetone, methylethyl ketone, diethyl ketone, etc., acids such as formic acid, acetic acid, propionic acid, butyric acids, and methyl and other esters thereof, etc., cyclic compounds such as furan, dihydrofuran, tetrahydrofuran, pyran, dihydropyran, tetrahydropyran, etc., phenol, etc., and other compounds in which the oxygen may occur either as part of the cyclic ring system or a side chain. Compounds of sulfur which are detrimental include hydrogen sulfide, mercaptans such as methyl mercaptan, ethyl mercaptan, propyl mercaptans, butyl mercaptans, amyl mercaptans, etc., thioethers such as dimethyl sulfide, methylethyl sulfide, diethyl sulfide, etc., disulfides such as dimethyl disulfide, methylethyl disulfide, diethyl disulfide, etc., thioaldehydes and thioketones, thioacids and esters thereof, and cyclic compounds including thiophene, dihydrothiophene, tetrahydrothiophene, thiapyran, dihydrothiapyran, tetrahydrothiapyran, thiophenol, etc. Compounds of nitrogen which are detrimental include ammonia, amines such as methyl amine, ethyl amine, propyl amines, butyl amines, amyl amines, dimethyl amine, diethyl amine, trimethyl amine, amides such as formamide, acetamide, etc., cyclic compounds such as pyrrole, dihydropyrrole, tetrahydropyrrole, pyridine, etc. Since the various compounds of oxygen, nitrogen and sulfur are present in the preferred saturated hydrocarbon feed stocks for the process of this invention in such small quantities, their exact nature has not been determined. However, their effect on the recently developed isomerization catalysts is very pronounced and thus, as set forth hereinabove, it is desirable and, in fact, necessary to remove such impurities prior to contact of and subsequent deactivation of the catalyst with feed stocks containing these impurities. By use of the novel process of this invention, as set forth hereinafter, these compounds of oxygen, nitrogen, and sulfur are eliminated and a continuous and economical process results therefrom.

In the first step in the process of my invention the isomerizable organic compound containing isomerization catalyst deactivating quantities of compounds of oxygen, nitrogen, and sulfur is treated with a treating agent at treating conditions. Since water and compounds of oxygen appear to be extremely detrimental, this treating step comprises in its most simple step drying. This drying can be accomplished, if water is the only compound of oxygen sought to be removed by distillation drying. The drying may also be accomplished by treating the isomerizable compound with a suitable drying agent, said drying agent comprising either a liquid or a solid. Suitable liquid drying agents include calcium chloride solutions, glycerol, glycols, such as diethylene glycol and triethylene glycol, with or without added ethanol amine for hydrogen sulfide removal, lithium chloride solutions, liquid phosphoric acid which may or may not contain free phosphorous pentoxide, sodium hydroxide, potassium hydroxide, concentrated sulfuric acid, etc. Insoluble or solid drying agents include such diverse materials as activated alumina, bauxite which is sold under trade names as Fluorite, Porocel, Driocel, etc., calcium sulfate or Drierite, metallic sodium, metallic potassium, calcium oxide, magnesium oxide, calcium hydride, barium oxide, silica gel, phosphoric acid impregnated on a suitable carrier such as a siliceous adsorbent and known in the art as solid phosphoric acid, etc. These drying agents will be utilized in a treating zone and disposed therein as liquid or solids as the case may be. The drying zone may also comprise one or more individual zones so that one drying zone may be in the process of regeneration while one or more of the others is in use. The drying zone or treating zone is maintained at suitable treating conditions of temperature and pressure so that adequate and complete drying of the feed stock takes place. Such temperatures and pressures will range from about 0° C. to about 300° C. and the pressure will range from about atmospheric to about 1000 pounds per square inch or more. The isomerizable compound is passed through such a zone at a space velocity such that adequate contacting is attained, suitable space velocities ranging from about 0.1 to about 1000 or more. The exact conditions utilized are, of course, dependent upon the particular drying agent selected. The drying agents set forth hereinabove are not necessarily equivalent and by the enumeration thereof, no intention is meant to infer any such equivalency.

As stated hereinabove, this drying step will be the minimum treating utilized. However, it may be utilized in combination with other treating steps, the combination of which steps for the purposes of this application is simply called treating. Other steps which may be utilized prior to drying include sodium plumbite treatment, hypochlorite treatment, treatment with alkaline reagents such as aqueous or alcoholic solutions of sodium hydroxide, potassium hydroxide, ammonia, lime with or without the utilization of solubility promoters. Such processes are normally carried out in liquid phase. However, various other processes which may be carried out in either liquid or vapor phase include contact with hydrogen as the treating agent and preferably in the presence of a hydrogenation catalyst. Suitable hydrogenation catalysts are selected from the metals including metal oxides and sulfides of group VI(A) and group VIII of the periodic table. The metals include chromium, molybdenum, tungsten, iron, cobalt, nickel, ruthenium, rhodium, palladium, osmium, iridium, and platinum. Examples of suitable sulfides of these metals include molybdenum sulfide, tungsten sulfide, nickel sulfide, cobalt sulfide, platinum sulfide, and mixtures thereof such as cobalt sulfide and molybdenum sulfide, cobalt sulfide and tungsten sulfide, nickel sulfide and tungsten sulfide, etc. Also, mixtures of oxides such as cobalt molybdate, nickel oxide and molybdenum oxide, etc. may be utilized. These metals, metal sulfide, metal oxides, and mixtures thereof preferably are composited with a carrying material such as inorganic oxides including silica, alumina, magnesia, zirconia, mixtures thereof such as silica-alumina, silica-magnesia, silica-alumina-magnesia, etc. and any of the above promoted with acid-acting substances such as halogens, phosphates, etc. The hydrogenation component may also be composited with naturally occurring substances such as bauxite, fullers earth, kieselguhr, clays montmorillonite, etc., which may or may not have been activated by special treatment with acids, steam, etc. The treating zone containing the hydrogenation catalyst may be operated at temperatures of from about 100° F. to about 800° F. and pressures of from about atmospheric to about 2000 pounds per square inch or more. The operating conditions in the hydrogenation zone are selected to perform the desired reduction in impurity content and the particular conditions to be utilized will depend upon the amounts of the impurities, the types of molecules in which the impurities occur, the purity of the hydrogen treating agent utilized in said zone, etc. Furthermore, these isomerizable compounds often contain small amounts of olefinic and/or aromatic hydrocarbons as impurities. These impurities are, of course, substantially diminished or removed by the hydrogenation treatment. In any of the above operations, the particular treating agent including drying agents and hydrogen are not necessarily equivalent and the use of any one or more will depend, as hereinabove set forth, upon the impurities present in the selected isomerizable compounds.

The isomerizable compound after treatment thereof is contacted with an isomerization catalyst prepared by vaporizing a Friedel-Crafts metal halide onto a refractory oxide, heating said thus formed composite at a temperature above about 300° C. for a time sufficient to remove therefrom any unreacted Friedel-Crafts metal halide.

As hereinbefore set forth, it has recently been found that especially satisfactory isomerization catalysts may now be prepared. While these catalysts are prepared from Friedel-Crafts metal halides, they do not contain free Friedel-Crafts metal halides as prior art catalysts of this general type have contained. In the preparation of these catalysts, the refractory oxide after vaporization thereon of a Friedel-Crafts metal halide and heating of the thus formed composite will be increased in weight by from about 2% to about 25% based on the original weight of the refractory oxide. While the exact increase in weight of the refractory oxide does not appear to be critical, it has been shown that high activity catalysts are obtained when the thus treated refractory oxide has been increased in weight from about 5 to about 20%. As stated hereinabove, these catalytic composites are prepared from a Friedel-Crafts metal halide but do not contain, after preparation, any free Friedel-Crafts metal halide. During the preparation and subsequent heating the Friedel-Crafts metal halide appears to react with the refractory oxide. The subsequent heating treatment is then carried out at a temperature above that required for vaporization of any free Friedel-Crafts metal halide at the conditions utilized.

In the first step in the preparation of these catalysts, a Friedel-Crafts metal halide is vaporized onto a refractory oxide. The amount of Friedel-Crafts metal halide utilized will range from about 5% to about 50% based on the weight of the refractory oxide, depending upon the exact manner of preparation. For example, if a batch type of vaporization method is utilized, about two times as much Friedel-Crafts metal halide per amount of refractory oxide is used as for the desired amount of weight increase in the final composite. In a continuous vaporization procedure, this amount can be lowered to one which is just slightly greater than the desired net weight increase of the final composite. It is obvious that this amount, in any case, is not critical and may be varied to arrive at the active catalyst resulting therefrom. Various Friedel-Crafts metal halides may be utilized but not necessarily with equivalent results. Examples of such Friedel-Crafts metal halides include aluminum bromide, aluminum chloride, antimony pentachloride, beryllium chloride, ferric bromide, ferric chloride, gallium trichloride, stannic bromide, stannic chloride, titanium tetrabromide, titanium tetrachloride, zinc bromide, zinc chloride, and zirconium chloride. Of these Friedel-Crafts metal halides, the Friedel-Crafts aluminum halides are preferred, and aluminum chloride is particularly preferred. This is so not only because of ease in operation in preparing the high activity catalysts for use in the process of this invention but also because the thus prepared catalysts have unexpectedly high activity.

In accordance with these recently disclosed processes, the Friedel-Crafts metal halides are vaporized onto a refractory oxide. Suitable refractory oxides include such substances as silica (a non-metallic refractory oxide), and various refractory metal oxides such as alumina, titanium dioxide, zirconium dioxide, chromia, zinc oxide, silica-alumina, silica-magnesia, silica-alumina-magnesia, chromia-alumina, alumina-boria, silica-zirconia, and various naturally occurring refractory oxides of various states of purity such as bauxite, kaolin or bentonite clay (which may or may not have been acid treated), diatomaceous earth such as kieselguhr, montmorillonite, spinels such as magnesium oxide-alumina spinels or zinc oxide spinels, etc. Of the above mentioned refractory oxides, alumina is preferred and particularly synthetically prepared gamma-alumina of a high degree of purity.

In preparing these catalysts, the temperature at which the Friedel-Crafts metal halide is vaporized onto the refractory oxide will vary in accordance with the particular Friedel-Crafts metal halide utilized. In some cases, since the Friedel-Crafts metal halide decomposes on heating to elevated temperature, it will be necessary to carry out such vaporization at reduced pressures to preclude such decomposition. However, in most instances the vaporization is carried out either at the boiling point or sublimation point of the particular Friedel-Crafts metal halide utilized or at a temperature not greatly exceeding these points, for exmaple, not greater than 100° C. higher than the boiling point or sublimation point of the particular Friedel-Crafts metal halide utilized. However, in some instances it may be desirable to carry out the vaporization and subsequent heating step at the same temperature and thus such temperatures are also within the generally broad scope of the present invention.

The preparation of these isomerization catalysts can perhaps be best understood by a description of a specific embodiment thereof. As set forth hereinabove, a particularly preferred refractory oxide for use in preparing the desired catalysts is alumina. Furthermore, of the various known forms of alumina, gamma-alumina is preferred. Furthermore, the alumina preferably is prepared synthetically and is of a high degree of purity. The methods of preparation of such synthetic aluminas are well known. For example, they may be prepared by the calcination of alumina gels which commonly are formed by adding a suitable reagent such as ammonium hydroxide, ammonium carbonate, etc., to a salt of aluminum such as aluminum chloride, aluminum sulfate, aluminum nitrate, etc., in an amount to form aluminum hydroxide which is converted to alumina by drying. It has been found that aluminum chloride generally is preferred as the aluminum salt, not only for convenience in subsequent washing and filtering procedures, but also because it appears to give the best results. Alumina gels are also prepared by the reaction of sodium aluminate with a suitable acidic reagent to cause precipitation thereof with the resultant formation of an aluminum hydroxide gel. Synthetic aluminas may also be prepared by the formation of alumina sols, for example, by reaction of metallic aluminum with hydrochloric acid, which sols can be gelled by suitable precipitation agents such as ammonium hydroxide followed by drying and calcination. In another embodiment of the present invention, these synthetically prepared aluminas may contain from about 0.01% to 8% combined halogen, preferably fluorine. These halogenated aluminas may be prepared in various manners, for example, by the addition of a suitable quantity of hydrofluoric acid to an alumina gel prior to drying and calcination thereof. In another manner, aluminum fluoride can be added to alumina gels thus yielding an alumina having the desired quantity of halogen combined therewith. When the synthetically prepared alumina is prepared from aluminum chloride, it is sometimes advantageous and/or desirable to minimize the washings thereof to control a desired amount of chlorine composited with the alumina. In any of the above instances wherein the alumina is prepared from an alumina sol or alumina gel, the resultant product is calcined to a sufficient temperature to convert the product into gamma-alumina. While the resultant aluminas may contain relatively small amounts of water of hydration, gamma-alumina with or without combined halogen is the preferred synthetically prepared alumina for use as the refractory oxide in the process of the present invention.

While the physical form of the refractory oxide is not critical, generally it is preferred to utilize macro particles so that the final composite may be used as a fixed bed in a reaction zone. Thus, it is desirable to form the synthetically prepared alumina into particles, for example, of 1/16 inch by 1/16 inch or 1/8 inch by 1/8 inch, etc. This is readily accomplished by grinding the dried alumina gel to a powder followed by pilling thereof by known methods. Alternatively, the particles may be in the form of spheres or irregularly shaped particles such as result from extrusion.

In carrying out one catalyst preparation, the above-described alumina has vaporized thereon aluminum chloride. This can be accomplished readily by sublimation of the aluminum chloride onto the surface of the particles. Aluminum chloride sublimes at 178° C. and thus a suitable vaporization temperature will range from about 180° to about 275° C. The sublimation can be carried out under pressure, if desired, and also in the presence of diluents such as inert gases including paraffinic hydrocarbons, nitrogen, etc. The amount of aluminum chloride which sublimes onto the above-described particles reaches a maximum at any particular vaporization temperature. In addition to vaporizing and subliming onto the alumina, the aluminum chloride also reacts therewith evolving hydrogen chloride. However, it is difficult to control the amount of aluminum chloride which reacts. Therefore, to insure freedom of the resultant composite from free aluminum chloride, the composite is then heated at a temperature above about 300° C. for a sufficient time to remove therefrom any unreacted aluminum chloride. Since aluminum chloride sublimes at 178° C., this heating treatment in the absence of further aluminum chloride results in freeing the thus prepared composite from free aluminum chloride. However, since aluminum chloride itself is tenaciously held onto an alumina surface, temperatures at least as high as the 300° C. indicated are required. This heating treatment can accomplish either further reaction of the unreacted aluminum chloride with the alumina, or simply sublimation of any unreacted aluminum chloride from the composite. Some hydrogen chloride evolution is noted upon vaporization of the aluminum chloride onto the alumina and during the subsequent heat treatment. This evolution is thought to be due to reaction of aluminum chloride with hydroxyl groups on the alumina surface. Thus, the first portion of the aluminum chloride vaporized onto the alumina particles may be in the form of oxy-aluminum dichloride which becomes admixed with free aluminum chloride upon further vaporization of the aluminum chloride thereon. However, regardless of whether or not this is so, the final catalyst composite is free from aluminum chloride, and it is the particular sequence of process steps which results in the unusual catalytic properties of the resultant composites. One unusual feature of the catalysts which are prepared in the above-described manner is that these catalysts may be utilized for reactions for which it has heretofore been considered necessary to utilize hydrogen halide promoters along with Friedel-Crafts metal halide such as aluminum chloride. While the use of hydrogen halide promoters with the catalyst compositions in the combination process of the present invention is not meant to be excluded thereby, it has usually been found unnecessary to utilize them to obtain satisfactory results with these compositions.

As set forth hereinabove, the composite of refractory oxide and Friedel-Crafts metal halide is heated at a temperature above about 300° C. for a time sufficient to remove therefrom any unreacted Friedel-Crafts metal halide. The exact temperature to be utilized will depend upon the boiling point or sublimation temperature of the particular Friedel-Crafts metal halide utilized. In general, particularly with aluminum chloride, temperatures of from about 400° C. to about 600° C. and times of from about 1 to about 48 hours are satisfactory. Furthermore, the refractory oxides utilized hereinabove are selected as substances suitable as catalyst supports for various reasons. One reason is that these substances, such as alumina, have high surface areas which appear to have beneficial effect upon catalyst activity. In many cases, these high surface areas are developed in the preparation of such supports under carefully controlled conditions of heating at specific temperatures for specific periods of time. Therefore, in the heating process step of the present invention, care must be taken so that these high surface areas are not destroyed by the subsequent heat treatment. Therefore, it is usually disadvantageous to carry out such heat treatments at temperatures above about 700° C. Of course, it is obvious that such temperatures are interrelated with the time at which such refractory oxides are kept at these temperatures. Therefore, care is exerted in all instances to maintain maximum surface area during the subsequent heating of the catalyst composites.

This heating step can be carried out in the presence of various inert diluent gases. Such gases include nitrogen, oxygen, air, hydrogen, carbon dioxide, and paraffinic hydrocarbons including methane, ethane, etc. These gases do not have an adverse effect upon the resultant catalyst activity. When the vaporization step and the heating step are combined, one or more of the above gases may be utilized as the carrier gas for the Friedel-Crafts metal halide as well as providing the proper atmosphere for the heating step.

As hereinabove set forth, one unusual feature of these catalysts is that they may be utilized as catalysts for isomerization reactions for which it has ordinarily been considered necessary to utilize hydrogen halide promoters therewith. While the use of hydrogen halide promoters with the catalysts compositions of the present invention is not meant to be excluded thereby, it has usually been found unnecessary to utilize them to obtain satisfactory results with these compositions. Compounds such as aromatic hydrocarbons and naphthenic hydrocarbons have been shown in the prior art to be cracking suppressors for the isomerization of saturated hydrocarbon reaction. Side reactions such as cracking encountered in the present process with the hereinabove-described catalysts are minimized and thus the use of such cracking suppressors has not been found to be necessary. However, if desired, they may be utilized in substantially the same manners as are well known in the prior art.

The process of the present invention is directed towards the isomerization of an isomerizable compound as hereinabove stated. This isomerization is preferably effected in a hydrogen atmosphere. While the use of hydrogen in processes of this general type as a cracking suppressor has been previously disclosed, it is felt that hydrogen pressure or partial pressure is an important variable in the process of this invention. Sufficient hydrogen should be utilized so that the hydrogen to hydrocarbon molar ratio of the reaction zone feed will be within the molar ratio of from about 0.25 to about 10. When smaller amounts of hydrogen are utilized, the catalyst rapidly deactivates and cracking reactions become prominent. The use of too much hydrogen is detrimental since the isomerization can be stopped completely by such means. The hydrogen may be supplied from any convenient source and will generally be recycled within the process so that hydrogen consumption will be for all practical purposes negligible except for the hydrogen consumed when hydrogen is utilized as a treating agent for the impure isomerizable compounds prior to isomerization thereof. The hydrogen may be purified or may be diluted with various inert materials such as nitrogen, methane, ethane, and/or propane.

The operating conditions to be employed in the isomerization zone will depend upon the particular compound being isomerized and generally will be at temperatures ranging from about 100° C. to about 300° C. although temperatures within the more limited range of from 150° C. to about 250° C. will generally be utilized. The pressure utilized will range from about 50 pounds per square inch to about 1500 pounds per square inch. As set forth hereinabove, the process of the present invention utilizing the above-described catalyst is particularly adapted for a so-called fixed-bed type process. In such a process, the compound or compounds to be isomerized after treating thereof as hereinabove set forth are passed in either an upward or downward flow over the isomerization catalyst along with hydrogen. The reaction products are then separated from hydrogen, which may be recycled, and subjected to fractionation and separation of the desired reaction product. Recovered starting material is recycled within the isomerization circuit so that the overall process yield is high. In such processes the hourly liquid space velocities which are defined as the volume of reactants per unit time per volume of catalyst will be maintained within the general range of from about 0.25 to about 10 and preferably within the range from about 0.5 to about 5. Another means of effecting the isomerization reactions of the present invention is to utilize a fluidized fixed bed of catalyst wherein the reactant or reactants are passed upwardly through a bed of the isomerization catalyst at a sufficient rate to maintain the individual particles of catalyst in a state of hindered settling. However, the rate of passage of the reactant through the bed is not so great as to suspend the catalytic material in the stream of isomerizable compound and carry it out of the reactor. As is readily apparent, smaller size particles than hereinabove described are suitable for such a modified operation. If desired, the catalyst may be utilized in the form of so-called micro particles and the process may be effected in a two-zone fluidized transfer process. In such a process when it is desired to regenerate the catalyst or reactivate it by other means, the catalyst may be suspended in a gas stream and conveyed to a second zone wherein it is contacted with reactivating material such as additional metal halide of the Friedel-Crafts type, after which the reactivated catalyst is returned to the reaction zone where it may be utilized to effect further isomerization reactions. Another suitable two-zone system may be the use of a moving bed wherein a dense bed of catalytic material slowly descends through the reaction zone, is discharged from the lower portion thereof into a reactivation zone from which it is transported again to the top of the bed in the reaction zone to again descend through the reaction zone effecting further isomerization in transit. Regardless of the particular operation employed, the products may be fractionated or otherwise separated to recover the desired product and to separate unconverted material which may be recycled. Hydrogen in the effluent likewise is separated and preferably is recycled. Should catalyst activators as hydrogen halides be utilized they will also be separated and recycled in a like manner.

The following examples are introduced to illustrate further the novelty and utility of the present invention but with no intention of unduly limiting the same. These examples are carried out in a continuous manner in bench scale apparatus. Driers which are utilized are stainless steel tubes 2 inches in diameter and 24 inches long which are filled with a drying agent. When hydrogen is utilized as a treating agent followed by a drying agent, the hydrogenation catalyst is placed in a stainless steel tube of about 1 inch inside diameter and about 50 inches long. The reactant and hydrogen are then passed through this reactor, a condenser, and a high pressure separator from which the treating hydrogen is vented. The hydrogen treated liquid is passed to the drying agent, and then to the isomerization reaction zone. The isomerization reaction zone reactor is a stainless steel tube similar to that described hereinabove. The hydrocarbon is fed to the treating and isomerization zones by the use of a charge pump at rates to be set forth hereinafter. The hydrogen charge is from a hydrogen cylinder and is dried before use. The reaction products are condensed, cooled to room temperature, and a phase separation is effected in a high pressure receiver. A portion of the hydrogen is recycled. A liquid product is collected, stabilized to remove low boiling hydrocarbons, and the desired boiling range reaction products are analyzed by vapor phase chromatographic or by infrared spectrographic techniques.

*Example I*

This example illustrates the isomerization of n-butane in the presence of a catalyst prepared by subliming aluminum chloride onto gamma-alumina, and heating said thus formed composite at a temperature above about 300° C. for a time sufficient to remove therefrom any unreacted aluminum chloride. The catalyst was prepared by a general method in which gamma-alumina was first prepared by dissolving aluminum pellets in hydrochloric acid to form a sol containing 15% aluminum. Hydrofluoric acid was added to the sol so that the final composite contained 0.375% fluorine by weight based on dry alumina. The resulting solution was mixed with hexamethylene tetraamine in a continuous mixer and dropped into an oil bath at about 90° C. to form spheres. The spheres were aged in the oil, and then in an aqueous solution of ammonia. The washed spheres were then transferred to a drier, dried at about 250° C. and calcined at about 600° C.

245.5 grams of gamma-alumina prepared as described were treated in hydrogen for two hours at 600° C. and then were placed in a glass liner in a rotating autoclave along with 98.2 grams of anhydrous aluminum chloride. The autoclave was sealed, pressured with 30 pounds per square inch of hydrogen, and heated and rotated for two hours at 250° C. After cooling, the pressure on the autoclave was released and upon removing the alumina it was determined that it had gained in weight equivalent to 12.5 grams per hundred grams of alumina. 110.3 grams of the above-prepared composite onto which aluminum chloride had been vaporized was placed in a glass tube heated by a horizontal furnace and nitrogen passed thereover for 18 hours while maintaining the composite at 315° C. and then for two additional hours while maintaining the composite at 540° C. Upon removal from the furnace, the thus treated composite was found to have lost weight so that its total net weight gain was 6.5 grams per 100 grams of the original grams. Thus, per 100 grams, the composite lost 6 grams. The thus treated composite was then tested for activity and stability for the isomerization of n-butane.

Fifty cc. of the catalyst was placed as a fixed bed in a reaction tube and utilized under conditions including a pressure of 300 p.s.i.g., 0.5 hydrogen to hydrocarbon molar ratio, 1.0 LHSV, and at various temperatures. At 100° C. the amount of isobutane in the plant effluent was 12.5%; at 150° C., this amount increased up to 38%; and at 200° C., this amount was 57%. This 57% isobutane product at 200° C. is the equilibrium quantity which can be obtained at that temperature. After these three activity points had been determined in 10 hours on stream, the catalyst was kept in operation at 200° C. for an additional period of 168 hours to test its stability under constant operating conditions. At 178 hours on stream, its activity had declined from 57% to about 18% isobutane in the plant effluent. Thus, while this catalyst is active for isomerization, it is not stable in the absence of feed treating.

*Example II*

This example illustrates the beneficial effect of the use of silica gel prior to isomerization in the presence of another sample of the same catalyst prepared as described in Example I. In this experiment, silica gel is disposed as a fixed bed in two separate vessels each containing about 1300 cc. thereof. The n-butane is treated by passage over this silica gel at room temperature and at atmospheric pressure by pumping 75 cc. per hour of the n-butane upflow through the two silica gel driers arranged in series. The n-butane is then passed over the isomerization catalyst at the same conditions described in Example I, namely 300 p.s.i.g., 0.5 hydrogen to hydrocarbon molar ratio, 1.0 LHSV, and at 200° C. The initial activity of this catalyst at 200° C. is again 57%. At the same on stream time of 178 hours, the catalyst in this example has an activity such that 55% isobutane still appears in the reaction zone effluent. Over the 178 hours on stream, the isobutane product is never below about 52% isobutane in the plant effluent. This operation is shut down at 300 hours on stream at which time isobutane production is still greater than 50%.

During this operation the silica gel driers are changed by removal of the used silica gel and replacement thereof with fresh silica gel every 75 hours on stream. From these results it is obvious that substantial isomerization, to practically equilibrium quantities, takes place. This isomerization is achieved in the absence of substantial amounts of side reactions, averaging at about 3% of the charge, and without utilization of added hydrogen chloride. By calculation of the amount of aluminum chloride present in the reaction zone as catalyst weight increase of the platinum-alumina composite, it is found that about 50 barrels of n-butane have been processed per pound of aluminum chloride. Prior art aluminum chloride consumption using aluminum chloride plus hydrogen chloride as the catalyst has disclosed maximum aluminum chloride utility of about one pound per hundred gallons. Thus, the present catalyst is in the neighborhood of about 21 times more active and its maximum life had not been reached at the duration of the above-described experiment.

*Example III*

This example illustrates the isomerization of n-hexane in the presence of a catalyst prepared by subliming aluminum chloride onto alumina and heating the thus prepared composite at a temperature above about 300° C. for a time sufficient to remove therefrom any unreacted aluminum chloride. The catalyst utilized in this experiment is substantially the same as that described hereinabove in Example I. In this experiment is illustrated a combination process for the isomerization of n-hexane in which process the n-hexane is treated with hydrogen in the presence of a hydrogenation catalyst followed by treating with a drying agent. The hydrogenation catalyst which is utilized is a composite of metallic nickel and kieselguhr containing about 65% nickel by weight. Two-hundred cc. of this nickel hydrogenation catalyst are placed in a reactor as described hereinabove and the n-hexane is passed thereover in the presence of hydrogen at 900 p.s.i.g., 200° C., 1.0 liquid hourly space velocity, and utilizing a hydrogen to hydrocarbon molar ratio of 1:1. The reactor effluent after separation of the hydrogen therefrom is then passed downflow over 1300 cc. of calcium sulfate or Drierite and then is collected in an n-hexane feed drum for charging to the isomerization reactor.

As stated hereinabove, the isomerization catalyst utilized in this experiment is the same as that described hereinabove in Example I. In this experiment 75 cc. of the isomerization catalyst is utilized. Isomerization reaction conditions include 900 p.s.i.g., an hourly liquid space velocity of about 1.0, a hydrogen to hydrocarbon molar ratio of about 6:1, and a temperature of 150° C. The feed stock analyzes greater than 98% n-hexane and about 1.0–1.5% methylcyclopentane. After about 15 hours on stream, the product analyzes as follows: 25.5% 2,2-dimethylbutane, 42.9% 2,3-dimethylbutane and 2-methylpentane, 19.3% 3-methylpentane, and 13.3% n-hexane. Its F–1 Clear octane number is 76.7 in comparison to about 28 for the feed; with 3 cc. of TEL its octane number is 94.1 in comparison to about 55 for the feed. After 200 hours on stream, analysis of the reaction zone effluent indicates that this catalyst has retained substantially all of its activity for the isomerization of n-hexane. Therefore, the combination process is effective for stabilizing the activity of this catalyst over a long period of time.

In a similar experiment without treating of this feed stock the isomerization catalyst rapidly deactivates from its high initial activity to substantially no conversion within about 48 hours time.

I claim as my invention:

1. A process for the isomerization of an isomerizable hydrocarbon containing isomerization catalyst deactivating quantities of compounds of oxygen, nitrogen, and sulfur which comprises treating said hydrocarbon with a drying agent at treating conditions and contacting said hydrocarbon at isomerization conditions with a catalyst prepared by vaporizing a Friedel-Crafts metal halide onto alumina, and heating said thus formed composite at a temperature above about 300° C. for a time sufficient to remove therefrom any unreacted Friedel-Crafts metal halide.

2. A process for the isomerization of an isomerizable saturated hydrocarbon containing isomerization catalyst deactivating quantities of compounds of oxygen, nitrogen, and sulfur which comprises treating said hydrocarbon with a drying agent at treating conditions, and contacting said hydrocarbon at isomerization conditions with a catalyst prepared by vaporizing a Friedel-Crafts metal halide onto alumina, and heating said thus formed composite at a temperature above about 300° C. for a time sufficient to remove therefrom any unreacted Friedel-Crafts metal halide.

3. A process for the isomerization of an isomerizable acyclic paraffin hydrocarbon containing isomerization catalyst deactivating quantities of compounds of oxygen, nitrogen, and sulfur which comprises treating said hydrocarbon with a drying agent at treating conditions, and contacting said hydrocarbon at isomerization conditions with a catalyst prepared by vaporizing a Friedal-Crafts metal halide onto alumina, and heating said thus formed composite at a temperature above about 300° C. for a time sufficient to remove therefrom any unreacted Friedel-Crafts metal halide.

4. A process for the isomerization of an isomerizable cyclic paraffin hydrocarbon containing isomerization catalyst deactivating quantities of compounds of oxygen, nitrogen, and sulfur which comprises treating said hydrocarbon with a drying agent at treating conditions, and contacting said hydrocarbon at isomerization conditions with a catalyst prepared by vaporizing a Friedel-Crafts metal halide onto alumina, and heating said thus formed composite at a temperature above about 300° C. for a time sufficient to remove therefrom any unreacted Friedel-Crafts metal halide.

5. A process for the isomerization of an isomerizable hydrocarbon containing isomerization catalyst deactivating quantities of compounds of oxygen, nitrogen, and sulfur which comprises treating said hydrocarbon with a drying agent at treating conditions, and contacting said hydrocarbon at isomerization conditions with a catalyst prepared by vaporizing a Friedel-Crafts aluminum halide onto alumina, and heating said thus formed composite at a temperature above about 300° C. for a time sufficient to remove therefrom any unreacted aluminum halide.

6. A process for the isomerization of an isomerizable saturated hydrocarbon containing isomerization catalyst deactivating quantities of compounds of oxygen, nitrogen, and sulfur which comprises treating said hydrocarbon with a drying agent at treating conditions, and contacting said hydrocarbon at isomerization conditions with a catalyst prepared by vaporizing a Friedel-Crafts aluminum halide onto alumina, and heating said thus formed composite at a temperature above about 300° C. for a time sufficient to remove therefrom any unreacted aluminum halide.

7. A process for the isomerization of an isomerizable acyclic paraffin hydrocarbon containing isomerization catalyst deactivating quantities of compounds of oxygen, nitrogen, and sulfur which comprises treating said hydrocarbon with a drying agent at treating conditions, and contacting said hydrocarbon at isomerization conditions with a catalyst prepared by vaporizing a Friedel-Crafts aluminum halide onto alumina, and heating said thus formed composite at a temperature above about 300° C. for a time sufficient to remove therefrom any unreacted aluminum halide.

8. A process for the isomerization of an isomerizable cyclic paraffin hydrocarbon containing isomerization catalyst deactivating quantities of compounds of oxygen, nitrogen, and sulfur which comprises treating said hydrocarbon with a drying agent at treating conditions, and contacting said hydrocarbon at isomerization conditions with a catalyst prepared by vaporizing a Friedel-Crafts aluminum halide onto alumina, and heating said thus formed composite at a temperature above about 300° C. for a time sufficient to remove therefrom any unreacted aluminum halide.

9. A process for the isomerization of an isomerizable hydrocarbon containing isomerization catalyst deactivating quantities of compounds of oxygen, nitrogen, and sulfur which comprises treating said hydrocarbon at treating conditions with hydrogen, then treating with a drying agent, and contacting said hydrocarbon at isomerization conditions with a catalyst prepared by subliming aluminum chloride onto alumina, and heating said thus formed composite at a temperature above about 300° C. for a time sufficient to remove therefrom any unreacted aluminum chloride.

10. A process for the isomerization of an isomerizable saturated hydrocarbon containing isomerization catalyst deactivating quantities of compounds of oxygen, nitrogen, and sulfur which comprises treating said hydrocarbon at treating conditions with hydrogen, then treating with a drying agent, and contacting said hydrocarbon at isomerization conditions with a catalyst prepared by subliming aluminum chloride onto alumina, and heating said thus formed composite at a temperature above about 300° C. for a time sufficient to remove therefrom any unreacted aluminum chloride.

11. A process for the isomerization of an isomerizable acyclic paraffin hydrocarbon containing isomerization catalyst deactivating quantities of compounds of oxygen, nitrogen, and sulfur which comprises treating said hydrocarbon at treating conditions with hydrogen, then treating with a drying agent, and contacting said hydrocarbon at isomerization conditions with a catalyst prepared by subliming aluminum chloride onto alumina, and heating said thus formed composite at a temperature above about 300° C. for a time sufficient to remove therefrom any unreacted aluminum chloride.

12. A process for the isomerization of an isomerizable cyclic paraffin hydrocarbon containing isomerization catalyst deactivating quantities of compounds of oxygen, nitrogen, and sulfur which comprises treating said hydrocarbon at treating conditions with hydrogen, then treating with a drying agent, and contacting said hydrocarbon at isomerization conditions with a catalyst prepared by subliming aluminum chloride onto alumina, and heating said thus formed composite at a temperature above about 300° C. for a time sufficient to remove therefrom any unreacted aluminum chloride.

13. A process for the isomerization of n-butane containing isomerization catalyst deactivating quantities of compounds of oxygen, nitrogen, and sulfur which comprises treating said n-butane at treating conditions with hydrogen in the presence of a hydrogenation catalyst, then treating with a drying agent, and contacting said n-butane at isomerization conditions with a catalyst prepared by subliming aluminum chloride onto gamma-alumina, and heating said thus formed composite at a temperature from about 400° C. to about 600° C. for a time from about 1 to about 48 hours to remove therefrom any unreacted aluminum chloride.

14. A process for the isomerization of n-pentane containing isomerization catalyst deactivating quantities of compounds of oxygen, nitrogen, and sulfur which comprises treating said n-pentane at treating conditions with hydrogen in the presence of a hydrogenation catalyst, then treating with a drying agent, and contacting said n-pentane at isomerization conditions with a catalyst prepared by subliming aluminum chloride onto gamma-alumina, and heating said thus formed composite at a temperature from about 400° C. to about 600° C. for a time from about 1 to about 48 hours to remove therefrom any unreacted aluminum chloride.

15. A process for the isomerization of n-hexane containing isomerization catalyst deactivating quantities of compounds of oxygen, nitrogen, and sulfur which comprises treating said n-hexane at treating conditions with hydrogen in the presence of a hydrogenation catalyst, then treating with a drying agent, and contacting said n-hexane at isomerization conditions with a catalyst prepared by subliming aluminum chloride onto gamma-alumina, and heating said thus formed composite at a temperature from about 400° C. to about 600° C. for a time from about 1 to about 48 hours to remove therefrom any unreacted aluminum chloride.

16. A process for the isomerization of methylcyclopentane containing isomerization catalyst deactivating quantities of compounds of oxygen, nitrogen, and sulfur which comprises treating said methylcyclopentane at treating conditions with hydrogen in the presence of a hydrogenation catalyst, then treating with a drying agent, and contacting said methylcyclopentane at isomerization conditions with a catalyst prepared by subliming aluminum chloride onto gamma-alumina and heating said thus formed composite at a temperature of from about 400° C. to about 600° C. for a time from about 1 to about 48 hours to remove therefrom any unreacted aluminum chloride.

References Cited in the file of this patent

UNITED STATES PATENTS

| | | |
|---|---|---|
| 2,338,472 | Van Peski | Jan. 4, 1944 |
| 2,456,557 | Dyduszynski | Dec. 14, 1948 |
| 2,493,499 | Perry | Jan. 3, 1950 |